(12) United States Patent
Luzzatto

(10) Patent No.: US 8,051,011 B2
(45) Date of Patent: **\*Nov. 1, 2011**

(54) ELECTRONIC CURRENCY, ELECTRONIC WALLET THEREFOR AND ELECTRONIC PAYMENT SYSTEMS EMPLOYING THEM

(75) Inventor: Kfir Luzzatto, Omer (IL)

(73) Assignee: Moneycat Ltd., Omer (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/539,181

(22) Filed: Aug. 11, 2009

(65) Prior Publication Data

US 2009/0319433 A1   Dec. 24, 2009

Related U.S. Application Data

(62) Division of application No. 09/644,104, filed on Aug. 2, 2000, now Pat. No. 7,590,602.

(30) Foreign Application Priority Data

Aug. 26, 1999  (IL) .......................... 131612
Aug. 31, 1999  (IL) .......................... 131672
Nov. 14, 1999  (IL) .......................... 132919

(51) Int. Cl.
*G06Q 20/00* (2006.01)
*G06Q 30/00* (2006.01)
*G06Q 40/00* (2006.01)

(52) U.S. Cl. ......... 705/69; 902/1; 902/2; 902/7; 902/24; 902/41

(58) Field of Classification Search .......... 705/69; 902/1, 2, 7, 24, 41

See application file for complete search history.

(56) References Cited

U.S. PATENT DOCUMENTS

| | | | | | |
|---|---|---|---|---|---|
| 5,461,217 A | * | 10/1995 | Claus | ................ | 235/380 |
| 5,748,737 A | * | 5/1998 | Daggar | ................ | 705/41 |
| 5,870,473 A | * | 2/1999 | Boesch et al. | ................ | 705/78 |
| 5,983,207 A | * | 11/1999 | Turk et al. | ................ | 705/39 |
| 6,003,764 A | * | 12/1999 | De Rooij et al. | ................ | 235/379 |
| 6,065,675 A | * | 5/2000 | Teicher | ................ | 235/380 |
| 6,188,993 B1 | | 2/2001 | Eng | | |

(Continued)

FOREIGN PATENT DOCUMENTS

WO    99/24921    5/1999

OTHER PUBLICATIONS

Electronic Payment Systems. O'Mahony, Donal et al. Artech House, Boston, MA, 1997. ISBN 0-89006-925-5. Front matter, back matter, contents, chapters 1 and 5, and index included.*

(Continued)

*Primary Examiner* — Andrew J. Fischer
*Assistant Examiner* — Christopher C Johns
(74) *Attorney, Agent, or Firm* — Roach Brown McCarthy & Gruber, P.C.; Kevin D. McCarthy

(57) ABSTRACT

Electronic currency consists of data in a form suitable to be stored in a user's data storage medium, comprising information on the data value, identification of each specific set of data or data point, and authentication information suitable to verify that said data has been generated by a specific Currency Issuing Authority (CIA). A method and a system for effecting currency transactions between two users over the Internet or other communication network are also described.

11 Claims, 10 Drawing Sheets

U.S. PATENT DOCUMENTS

| | | |
|---|---|---|
| 6,289,462 B1 | 9/2001 | McNabb et al. |
| 6,728,880 B1 | 4/2004 | Sites |
| 7,010,512 B1* | 3/2006 | Gillin et al. .................. 705/39 |
| 7,089,208 B1 | 8/2006 | Levchin |
| 7,143,062 B2* | 11/2006 | Turk et al. .................. 705/38 |
| 7,181,429 B1* | 2/2007 | Lee .................. 705/41 |
| 7,328,840 B2* | 2/2008 | Kawai et al. .................. 235/380 |
| 7,366,699 B1* | 4/2008 | Kusakabe et al. .................. 705/43 |
| 2001/0011248 A1* | 8/2001 | Himmel et al. .................. 705/39 |
| 2002/0004779 A1* | 1/2002 | Turk et al. .................. 705/39 |
| 2002/0130175 A1* | 9/2002 | Nakajima .................. 235/379 |
| 2002/0151356 A1* | 10/2002 | Burns et al. .................. 463/25 |
| 2004/0083182 A1* | 4/2004 | Moribatake et al. .................. 705/64 |
| 2004/0206814 A1* | 10/2004 | Kawai et al. .................. 235/380 |
| 2007/0244812 A1* | 10/2007 | Turk et al. .................. 705/39 |

OTHER PUBLICATIONS

A withdrawn complaint regarding U.S. patent No. 7,590,602; filed on Aug. 30, 2010 at United Stated District Court for the District of Delaware, 4 pages.

U.S. Appl. No. 60/172,311, filed Dec. 17, 1999; publicly available on Feb. 13, 2001 when U.S. patent No. 6188993 issued; 188 pages.

U.S. Appl. No. 60/144,633, filed Jul. 19, 1999; publicly available on Feb. 13, 2001 when U.S. patent No. 6188993 issued; 15 pages.

U.S. Appl. No. 60/131,785, filed Apr. 30, 1999; publicly available on Feb. 13, 2001 when U.S. patent No. 6188993 issued; 13 pages.

* cited by examiner

ELECTRONIC CURRENCY, ELECTRONIC WALLET THEREFOR AND ELECTRONIC PAYMENT SYSTEMS EMPLOYING THEM

REFERENCE TO CO-PENDING APPLICATIONS

This application claims priority as a divisional application of U.S. patent application Ser. No. 09/644,104, filed on Aug. 23, 2000 (allowed); which claims priority to (a) Israeli patent application number 132919, filed on Nov. 14, 1999; (b) Israeli patent application number 131672, filed on Aug. 31, 1999; and (c) Israeli patent application number 131612, filed on Aug. 26, 1999.

FIELD OF THE INVENTION

The invention relates to electronic currency. More particularly, the invention relates to electronic cash money "to the bearer", to electronic wallets carrying such cash money, and to electronic payment systems employing them.

BACKGROUND OF THE INVENTION

Electronic payment transactions have become increasingly important, and tremendous efforts are constantly placed into the development of suitable systems for carrying out such transactions. One such system is the so-called "electronic wallet" or "electronic purse", which holds sums of money withdrawn from a bank, which can be used to pay for goods and services. The electronic wallet present several problems which, so far, have limited its use: it has a considerable security problem, inasmuch as the loss of the wallet entails the loss of the money it carries, it requires sophisticated storage means, coupled with a "smart card", as well as complicated and expensive encryption procedures. It further presents a disadvantage that renders it unattractive for many persons, namely, it causes a loss of feeling of control over the money it contains. Since all procedures are automated, encrypted and electronic, with only minimal intervention of the owner, many owners feel that they have no real control over the movement of their money.

Electronic cash has many applications, ranging from the use of electronic wallets carried on the owner, in lieu of credit cards, in daily transactions and including payments for goods and services purchased over the Internet. While purchases made over the Internet are by no means the sole use for the electronic cash, they probably are the most problematic, mainly because of security problems.

The problem of payments over the Internet is well known, and many solutions to it have been suggested. The problem is a complicated one, because the use of credit cards over the Internet is unsafe, and because in many transactions the buyer does not wish to provide details of himself, or of his bank account.

Among the systems suggested to overcome this problem, there can be mentioned a few. For instance, a concept called "First Virtual" first asks a potential customer to fill out an application form providing standard personal information. First Virtual would then send a personal identification number (PIN) with an 800 number over the Internet to the customer's email. Then the customer is supposed to use the 800 number to give the customer's credit card information over the phone to First Virtual to establish or open no more than just an electronic charge account.

Another concept called "Cybercash" requires customers or buyers on the Internet to first open a special Cybercash bank account that contains money designated for spending on the Internet. A consumer issues instructions to purchase goods or services on the Internet and money for these items are transferred from the consumer's Cybercash bank account to that of the merchant's. Transactions are anonymous unless the seller specifically asks for the identity of the buyer.

Yet another concept called the "Netbill" requires a buyer on the Internet to first put money in a Netbill account and subsequent transactions made by the buyer are to be drawn off from the account sum or balance. Accounts of both buyers and sellers are maintained on a Netbill server, to keep transactions off the Internet and to maintain lower transaction costs. After a purchase is made, the transfer of funds will automatically take place at the server. Digital goods, e.g. programs, documents etc. are transferred to the buyer in encrypted form. When the Netbill account has cleared the transaction, a receipt containing the key to the encrypted goods is sent to the merchant, then forwarded to the consumer.

A two-step process called "Millicent" had also been introduced, using fake money. A merchant creates its own electronic currency, or "scrip", that is sold to brokers. Brokers then sell the scrip to buyers. Sellers deal with just a handful of accounts, spreading transaction costs over a large volume of purchases. Millicent customers need to buy currency from only a few trusted brokers.

Another system is the so-called "Digicash" or "ecash". In theory this system turns a user's or buyer's hard drive on a PC into a purse. To use this system, one first establishes an account with a bank. To obtain digicash or ecash, the user creates a series of numbers that will represent a mixture of coins or money bills in various denominations according to the user's own wishes. This request for digicash is then sent to the bank, which deducts the total amount requested from the user's existing valid account. The bank then sends the user an equivalent amount of ecash as an encrypted email message containing a series of numbers. Each number corresponds to a specified amount of money. Before the user can actually use these encrypted series of numbers from the bank to purchase goods or services on the Net, the user must first obtain a user name and a password from Digicash. Then the user has to download Digicash's ecash software to the user's PC. The final step is to create the user's own encryption key (in essence another password) and together with the user's password obtained earlier from Digicash, the user can then spend ecash on the Net. The operation of this system is illustrated in FIG. 1.

Another prior art system is NetCash, which is described in "Gennady Medvinsky and B. Clifford Neuman, *Electronic Currency for the Internet*, Electronic Markets Vol 3. No. 9/10, October 1993, pages 23-24", and in "Gennady Medvinsky and B. Clifford Neuman, *NetCash: A design for practical electronic currency on the Internet*, In Proceedings of the First ACM Conference on Computer and Communications Security, November 1993. It is a framework for electronic cash developed at the Information Sciences Institute of the University of Southern California. It uses identified on-line electronic cash. Although the cash is identified there are mechanisms whereby coins can be exchanged to allow some anonymity. The system is based on distributed currency servers where electronic checks can be exchanged for electronic cash. The NetCash system consists of buyers, merchants, and currency servers. An organization wishing to set up and manage a currency server obtains insurance for the new currency from a central certification authority. The currency server generates a public/private key pair. The public key is then certified by being signed by the central authority. This certificate contains a certificate ID, name of the currency server, currency server's public key, issue date and an expiry date, all signed by the central authority:

The currency server mints electronic coins, which consist of:
1. Currency Server Name: Identifies a currency server.
2. Currency Server Network Address; Where the currency server can be found. If this address is no longer in use, a name server can be queried to find the current address.
3. Expiry Date: Limits the state that must be maintained by each currency server.
4. Serial Number: Uniquely identifies the coin.
5. Coin Value: Amount coin is worth.

The coin is signed with the currency server's private key. The currency server keeps track of the serial numbers of all outstanding coins. In this way double spending can be prevented by checking a coin's serial number with the currency server at the time of purchase (or exchange). If the coin's serial number is in the database it has not been spent already and is valid. When the coin is checked the serial number is then removed from the database. The coin is then replaced with a new coin (coin exchange). An electronic cheque can be exchanged with a currency server for electronic coins. The currency server is trusted not to record to whom the coins are issued. To further aid anonymity a holder of coins can go to any currency server and exchange valid coins for new ones. The currency server does not know who is exchanging coins, only the network address of where they are coming from. By performing the exchange and by choosing any currency server to do this with, it becomes difficult to track the path of the coins. If a currency server receives coins that were not minted by it, it will contact the minting currency server to validate those coins.

FIG. 2 shows how a buyer uses NetCash coins to purchase an item from a merchant. In this transaction the buyer remains anonymous since the merchant will only know the network address of where the buyer is coming from. NetCash assumes that the buyer has or can obtain the public key of the merchant, and that the merchant has the public key of the currency server.

Another system that has been suggested is the PayMe system (Michael Peirce and Donal O'Mahony, "Scaleable, Secure Cash Payment for WWW Resources with the PayMe Protocol Set", presented at the Fourth International World Wide Web Conference, Dec. 11-14, 1995, Boston, Mass., USA—http://www.w3.org/Conferences/WWW4/Papers/228/). PayMe is an on-line electronic cash system. The entities involved are banks and users. Users can be either buyers or merchants but each has the same functionality. They can make payments, accept payments, or deal with the bank. Each bank mints its own identified electronic cash with serial numbers. Double spending of coins is prevented by the bank maintaining a database of coins in circulation. Any user in the PayMe system can accept payments and make payments. Merchants can receive payments for selling Web goods but they can also make payments to the buyers. This can be used for making refunds or in pay-out services. A simple model showing the basic functionality of the PayMe system is shown in FIG. 3.

Both symmetric and public-key cryptography are used. Each entity has its own pubic/private key pair. It is a stand-alone system which has been tailored for use with the Web. The PayMe system uses its own secure communications protocol, the PayMe Transfer Protocol (PMTP), to communicate between entities.

Coins are the pieces of data that represent monetary value within the system. The coins are digitally signed by the bank using public key cryptography to make them valid currency. Each coin has a serial number which is entered into the bank's database when the coin is minted. Coins have fields for the coin value, serial number, bank id, bank host name and port number, and expiry date. When these five fields are put together and signed with the bank's private key, a valid coin is created.

PayMe can be used with any Web client or server. To purchase an item a user starts up both their PayMe Wallet and any Web client. They browse the Web until they find a merchant shop, which will be presented by a HTML document. A combination of PMTP messages are used in a purchase transaction, as shown in FIG. 4.

All the aforementioned systems require a direct interaction between the seller and the buyer during the transfer of the payment and/or involve complicated and time-consuming key agreement processes.

In a recently issued patent, U.S. Pat. No. 5,913,203, a system is suggested, which is stated to provide totally anonymous or effectively anonymous cash-like transactions, which are accomplished by using a pseudo cash data package converter for inserting a user key into a pseudo cash preliminary data packet through the use of a user insertion key to generate a pseudo cash unit with a fixed monetary value that can be used to purchase goods or services via the Internet. A pseudo cash repository facilitates the cash-like transactions and maintains a record of the pseudo cash units and their fixed monetary value. Depending upon the level of anonymity selected by a purchaser, the pseudo cash repository can either transmit pseudo cash preliminary data packets or pseudo cash units to a first entity. If the first entity loses an effectively anonymous pseudo cash preliminary data packet, it can be replaced by the pseudo cash repository without risk of loss.

This patent is said to solve one of the prior art problems existing, e.g., in the Digicash system, in which a user's ecash is stored as a series of numbers on the hard disk of his PC. This leads to the danger that, if one has a disk crash, which is quite common nowadays in view of the complexities of modern day software, or if one's computer is stolen, one has lost his money.

Another severe drawback of certain systems is that they require that the cash dispenser be involved in the transaction, to identify the users (either the buyer, the seller, or both), rendering the transaction cumbersome, and detracting from its privacy.

Because, of these facts, there is currently no electronic "currency" that can be used in a simple manner by the general public as well as by Internet surfers, just as one uses bills, coins or checks. For this reason, e-commerce is still relatively limited both in physical transactions, such as in shops and in service-providing establishments, and over the Internet. It is therefore clear that there is a great need for an electronic currency that overcomes the disadvantages of the prior art.

All the prior art methods and systems suffer from severe drawbacks arising from a misconception that could be termed "excessive protectivity". The prior art does not take into account that most transactions made over the Internet or other LANs or WANs involve small sums. While it is important to ascertain that theft of such sums is made difficult, just as one keeps his pocket money, the danger of theft does not justify the complexity of the systems devised by the prior art.

Additionally, and largely because of said misconception, most of the prior art systems require the user to open an account with either a bank, or a pseudo-bank, or with a supplier, and either to provide prepaid funds to these accounts, from which it possible to draw, or to perform relatively complicated operations when the user wishes to spend, withdraw or generate funds.

Another severe drawback of certain systems is that they require that the cash dispenser be involved in the transaction, to identify the users (either the buyer, the seller, or both), rendering the transaction cumbersome, and detracting from its privacy.

Because, of these facts, there is currently no electronic "currency" that can be used in a simple manner by the general public in physical transactions or when surfing the Internet, just as one uses bills, coins or checks. For this reason, e-commerce is still relatively limited in physical shops and over the Internet.

It is therefore clear that it would be highly desirable to provide an electronic currency system which is free from all the aforementioned drawbacks, and which permits e-commerce to proceed freely, in a manner as similar as possible to live commerce.

It is therefore an object of this invention to provide electronic currency and a system for its implementation, that overcome all the aforementioned drawbacks of the prior art.

It is another purpose of this invention to provide electronic currency that can be converted to and from regular currency, and which can be transferred in real time from one Internet user to another.

It is a further purpose of the invention to provide an electronic currency and system which are user-independent, and which do not require a user key or identification, such currency being essentially "to the bearer".

It is yet another object of the invention to provide electronic currency in electronic form that can be lawfully copied onto magnetic, optical or other media, so as to ensure against loss or crashes of the media where the currency is saved.

It is a further object of the invention to provide electronic money and systems employing it, which can be used for carrying out transactions over the Internet.

It is still another object of the invention to provide a method and system which permit to carry out delayed-payment transactions, much as when paying for goods or services with a post-dated check.

It is a further object of the invention to provide a method and currency which can be used for the simultaneous service receipt/payment, and which can further be used for payments which are linked to the quantity of goods or services electronically furnished.

Many preferred embodiments of the invention are useful in any system in which no concern for electronic theft exists, such as, e.g., private LANs or WANs, or public WANs, such as the Internet, in which other independent security means are provided, either by algorithmic or by electronic methods. However, if no independent security system exists, there remains a concern that currency theft may be effected at the user's level, e.g., by hostile downloadables or virus-like programs that may infiltrate the user's system. Such programs may, unknown to the user, copy the valid currency from the location where it is stored to another location, and then use it to carry out purchases. Such programs may even copy the entire data hard disk or other drive where the Internet money is stored.

Although the use of small amounts of money for small purchases greatly diminishes this danger, theft of this type is still possible. Furthermore, it is also possible, when the problem of this kind of theft (as opposed to physical theft) is solved, to use the aforementioned method for transactions involving large sums.

It is therefore another object of the present invention to provide a method and system for eliminating the problem of electronic theft of electronic currency, in systems employing an isolation server to effect currency transactions.

It is still another object of the invention to provide apparatus useful in exploiting the invention.

Other purposes and advantages of this invention will appear as the description proceeds.

SUMMARY OF THE INVENTION

The invention is directed to electronic currency, consisting of data in a form suitable to be stored in a user's data storage medium, said data comprising information on the data value, identification of each specific set of data or data point, and authentication information suitable to verify that said data has been generated by a specific Currency Issuing Authority (CIA).

According to a preferred embodiment of the invention the data consists of a plurality of data packets, each data packet comprising information on its value, a unique identificator, suitable to verify the identity of the data packet, and authentication information, suitable to verify that the data packet has been generated by a specific Currency Issuing Authority (CIA).

According to another preferred embodiment of the invention each data packet comprises a plurality of sub-data packets of value smaller than that of the data packet. Preferably, but non limitatively, the value of all sub-data packets is the same.

The electronic currency of the invention can be stored on any suitable storage medium, e.g., on a magnetic data carrier such as a diskette or a hard disk drive, or on an optical data carrier, such as a CD-ROM, or can be stored in machine-readable printed form, such as a bar code.

Broadly speaking, the invention can be used, in various embodiments thereof, inter alia, in one of the following three systems:
1) In private systems where anti-theft measures are taken care by the structure or independent security means of the system;
2) In any system where anti-theft measures are provided at the user's level, e.g., at the CPU level; or
3) In any system, regardless of its inherent level of security, using the additional data of the invention, that will be discussed in detail below.

As said, the electronic currency of the invention can be used in any way, for electronic commerce, whether by means of an electronic wallet or purse carried by the owner, or in remote e-commerce carried out over communication lines, such as cellular telephone systems or any other line of communication over which e-commerce can be effected, the most important example of which is the Internet e-commerce.

Throughout this specification, when reference is made to the Internet as the e-commerce system, it is meant to indicate any other communication method or system over which e-commerce can be effected, and the description to follow applies mutatis mutandis to any such communication method and system. The Internet is used here for the sake of illustration, it being understood that the invention is not limited to it, or to any other particular system. Furthermore, when reference is made to a network, it may also refer to mixed networks, e.g., where two different networks cooperate in the communication system, such as may be a cooperation of the Internet with a cellular phone system, via an appropriate interface that will be easily appreciated by the skilled person.

Thus, in another aspect, the invention is directed to an Internet currency system, comprising:
at least one user connected to the Internet;
at least one supplier connected to the Internet;

a data packets database (DPD) associated with a Currency Issuing Authority (CIA) comprising information on each and every data packed issued by said CIA;

one or more Currency Issuing Authority trusted servers (CIAS), said trusted servers collectively comprising:
  a) access to the DPD of the CIA;
  b) software to communicate with an active data packet area of a user, and to manipulate data packets located therein;
  c) software to generate data packets; and
  d) software to transmit data packets to a provider or to another user over the Internet or other communication channel.

In still another aspect, the invention is directed to a method for effecting currency transactions between two users over a communication system, such as the Internet, comprising:
  a) providing a plurality of data packets representative of a sum, each of said plurality of data packets comprising information on its value, a unique identificator, suitable to verify the identity of the data packet, and authentication information, suitable to verify that the data packet has been generated by a specific Currency Issuing Authority (CIA);
  b) providing an active data packets area in a data storage medium associated with a first user, comprising one or more of said data packets;
  c) when a transaction is to be effected, allowing a CIA trusted server CIAS to gain access to said active data packets area, and to manipulate data therein;
  d) transmitting to the CIAS information representing the sum to be transferred from the first user to the second user;
  e) transmitting to the CIAS data packets cumulatively representative of the sum to be transferred from said first to said second user;
  f) verifying in the CIAS the identity of the data packets as having been issued by the specific CIA involved;
  g) verifying in the CIAS that the data packets have not been previously used to effect a previous transaction;
  h) when verification required in steps f) and g) has been obtained, carrying out the steps of:
    (1) removing the data packets involved in the transaction from the active data packets area of the first user, by deleting them or marking them as spent; and
    (2) generating new data packets corresponding to the sum of the data packets removed in step (1), less any commission, if any, and transmitting them to the second user.

In the context of the invention different types of users exist. Typically, one user will be the buyer and another will be the provider of services or goods. The terms "user" and "provider" are used interchangeably, as required in any case to better illustrate the specific situation discussed. Thus, according to a preferred embodiment of the invention in the method discussed above the second user is a services or goods provider.

The authentication information included in the data packet is preferably, but non-limitatively, encrypted. The data storage medium in which the active data packets are provided can be of any suitable type, e.g., it can be a hard disk drive, or an optical disk drive, or the like, located on the Internet terminal of the first user. Alternatively, said data storage medium can be a hard disk drive, or an optical disk drive, or an electro-optical disk drive, or the like, located away from the Internet terminal of the first user.

According to one particular embodiment of the invention the data storage medium in which the active data packets are provided is a diskette located in a floppy disk drive of the Internet terminal of the first user. According to another preferred embodiment of the invention the data storage medium in which the active data packets are provided is a smart card located in a smart-card reader associated with the Internet terminal, or other terminal, of the first user.

In the context of the present invention the terms "PC", "Internet terminal" and "computer" are used interchangeably, and they all mean computer-based devices which are capable to connect over a LAN or WAN, such as the Internet or a cellular phone network, and to perform basic communication functions, and they include cellular phone devices.

In a preferred embodiment of the invention an Agent located on the user's PC is used to permit the CIAS to gain access to the active packet area of the user. Preferably, but non limitatively, the verification that the data packets have been issued by the specified CIA is effected by decrypting an encrypted identificator associated with the data packet. The verification that the data packets have not been previously used in a previous transaction, on the other hand, can be effected by verifying the data packet status in the CIA data packet database using its unique identificator.

The newly generated data packets can be transmitted to the second user in any suitable way, e.g., by writing them directly on a specified data storage area, or by allowing it to download the data packets from the CIAS.

The invention also encompasses a method for reclaiming lost or stolen electronic money in the electronic currency system of the invention, comprising contacting a CIAS with the data identifying the specific data packets deemed to be lost or to have been stolen, and receiving new, replacement data packets to replace those lost or stolen, after the CIAS has: 1) invalidated the data packets deemed lost or stolen in the CIA database; and 2) the CIAS has kept the newly generated data packets in escrow, against a legitimate claim for the invalidated data packets by a third person, for a predetermined period of time.

In another aspect, the invention comprises a method for effecting delayed payments over the Internet (or other communication system) in the Internet currency system of the invention, comprising setting an agreed date for payment by a first user to a second user, allowing a CIAS server to invalidate an agreed to sum owned by said first user, and transferring said agreed to sum from the CIAS to the second user at a predetermined time.

The invention further provides a method for effecting simultaneous receipt by a user of goods or services provided by a provider, and payment therefor, in the Internet currency system of the invention, comprising providing to a CIAS data concerning fractional payments to be made, and the time intervals at which such payments are to be made, continuously verifying by the provider that such fractional sums are received at the required time intervals, continuing to provide the service or goods as long as said sums are received at the required time intervals, and discontinuing or suspending the provision of said services or goods if said fractional payments cease to be received. The services received can be of any kind, such as software services, for instance, gaming software services, or music or images.

The electronic currency can be converted into other currencies by setting an exchange rate for the electronic currency relative to real currencies or to other electronic currencies originating from other CIAs, providing the electronic currency to be exchanged to an exchange agent, for invalidation by a CIAS, and receiving from said exchange agent the exchanged currency after a corresponding amount has been sent by the CIAS to the account of the exchange agent. In the case that the exchange agent is a CIAS, all transactions are effected directly from and to the user's data storage areas and/or physical accounts.

In another aspect, the invention is directed to a method for effecting transactions over a LAN or WAN, such as the Internet or a cellular telephone network, comprising indirectly exchanging currency between different parties through at least one intermediary, and wherein the identity of the currency reaching said intermediary from a first user changes before leaving said intermediary to a second user. The intermediary may, of course, be a server.

In yet another aspect, the invention is directed to a system for effecting transactions over a LAN or WAN, such as the Internet or a cellular telephone network, comprising at least one isolation server and two or more user connected between them over the Internet or the cellular telephone network for communication purposes, but isolatedly connected between them through said isolation server for the purpose of exchanging electronic money between them. The terms "isolation" or "isolation server" are meant to indicate that no simultaneous or direct involvement exists between the users in the process of moving currency through the LAN or WAN.

In another aspect, the invention is directed to a method for preventing the electronic theft of electronic currency, said electronic currency consisting of data in a form suitable to be stored in a user's data storage medium associated with at least one device connectable to a LAN or WAN, such as the Internet or a cellular telephone network, said data comprising information on the data value, identification of each specific set of data or data point, and authentication information suitable to verify that said data has been generated by a specific Currency Issuing Authority (CIA), comprising:

(a) generating one or more sequences of symbols, each of said one or more sequence of symbols being associated with a specific set of data;
(b) whenever a part of said specific set of data is to be used as electronic currency, providing to a Currency Issuing Authority trusted Server (CIAS) at least one of said one or more sequence of symbols;
(c) authenticating said part of said specific set of data only if said one or more sequence of symbols matches the identification of said specific set of data.

Each sequence of symbols used to match the identification of a specific set of data is spent and cannot be used again. Thus, it is impossible to use a spent sequence of symbols in conjunction with another part of the same set of data. The CIAS keeps record of spent sequences of symbols, and does not validate any more payments that rely on a spent sequence of symbols. In the context of this invention the terms "additional data" and sequence of symbols" are used interchangeably to indicate the same entity.

It should be realized that in this way the electronic theft is rendered impossible. The CIA prevalidates a given sum for a given payment requested by the user, and completes the validation process when the sequence of symbols is entered by the user. Since the sum and sequence of symbols are related to a specific payment, but the sequence is given only after the sum itself has been validated, there is no way this information can be used by an electronic thief, since it is known only to the user and the CIAS prior to validation, and becomes useless on validation.

Whenever a further part of said specific set of data is to be used as electronic currency, a Currency Issuing Authority trusted Server (CIAS) is provided with at least a remaining one of said one or more sequence of symbols, other than any previously spent sequence of symbols. This sequence is different from the one already used, and is known only to the user and CIAS.

According to a preferred embodiment of the invention each of said sequences of symbols can be used for any sub-set of a specific set of data.

According to another preferred embodiment of the invention the sequence of symbols is such as to be input by a computer-related device. The computer-related device can be any suitable device and, for instance, can be selected from a keyboard, a mouse, an optical reader, a bar-code reader, a communication port, a magnetic card reader or a smart-card reader.

The additional data or sequence of symbols can be of any suitable type. According to a preferred embodiment of the invention, for convenience of use by the user, the sequence of symbols comprises digits and/or characters.

The one or more sequences of symbols is uniquely related to a specific set of data packets. The relation can be of any type, For instance the relation of the sequence of symbols to the set of data packets can connected to the data packet unique identification, e.g., by a formula used to calculate it, or by a part of the unique identificators of data packets within a set or subset, or by additional set identificators, etc.

The additional data or sequence of symbols can be provided to the user in any suitable manner, as long as it remains known only to the CIAS and to the user, and is not available on a computer or storage area where an electronic thief may retrieve it. According to a preferred embodiment of the invention the one or more sequences of symbols are printed on a printed matter, e.g., printed matter which is supplied together with a data carrier, or attached to it, or directly printed thereon.

According to another preferred embodiment of the invention the one or more sequences of symbols are printed out by printer means associated with Internet currency dispensing apparatus, e.g., by a cash machine.

It should be appreciated that the additional data has the added advantage of providing the user with increased control over the electronic transaction. Thus, many of the average user's current reservations over the use of electronic purses, where processes take place over which the user has no control, are overcome by the additional safety feature of the additional data which is under the direct control of the user.

The additional data is preferably, but non-limitatively, generated in a random manner, such that there is no fixed rule that may permit a thief to calculate a set of additional data from one already used. The additional data may be provided to the user in many ways, e.g., in printed form when issuing the currency, as detailed above, or by any other channel. For instance, if the user wishes its bank to issue to him electronic money by modem connection between its terminal and the bank, the additional data may be faxed to the user by the bank, or provided by any other different channel.

In another aspect the invention is directed to a method for effecting secure currency transactions between two users over a LAN or WAN, such as the Internet or a cellular telephone network, comprising carrying out a conditional validation of a sum of electronic money being transferred from a user to a CIA, and finalizing the validation of said sum by verifying the matching of additional data provided to the CIA by the user with the specific data making up said sum of electronic money, wherein said additional data has been provided to the user through channels other than the LAN or WAN, and wherein said additional data can be used for one transaction only.

As before, according to a preferred embodiment of the invention the additional data is provided to the user in printed form, and may comprise, e.g., a sequence of numbers and/or of characters.

According to a preferred embodiment of the invention the method comprises:

a) providing a plurality of data packets representative of a sum, said plurality of data packets constituting a set, and each of said plurality of data packets comprising information on its value, a unique identificator, suitable to verify the identity of the data packet, and authentication information, suitable to verify that the data packet has been generated by a specific Currency Issuing Authority (CIA), and wherein all data packets in a set comprise a common identificator;

b) providing an active data packets area in a data storage medium associated with a first user, comprising one or more of said data packets;

c) transmitting to the CIAS information representing the sum to be transferred from the first user to the second user;

d) transmitting to the CIAS data packets cumulatively representative of the sum to be transferred from said first to said second user;

e) verifying in the CIAS the identity of the data packets as having been issued by the specific CIA involved;

f) verifying in the CIAS that the data packets have not been previously used to effect a previous transaction;

g) when verification of steps e) and f) has been completed, obtaining from the user the additional data, and verifying its matching to the set of data packets from which said data packets have been taken;

h) when verification required in g) has been obtained, carrying out the steps of:
  (1) removing the data packets involved in the transaction from the active data packets area of the first user, by deleting them or marking them as spent;
  (2) generating new data packets corresponding to the sum of the data packets removed in step (1), less any commission, if any, and transmitting them to the second user; and
  (3) invalidating the additional data used in step g) as a matching additional data for said set of data packets.

According to a preferred embodiment of the invention the common identificator of all data packets in a set is generated from the unique identificators of the individual data packets. According to a preferred embodiment of the invention the matching of the additional data to the data packets is effected by calculation based on the additional data and to data contained in the data packets. According to another preferred embodiment of the invention the matching of the additional data to the data packets is effected by comparison with a look-up table available to the CIAS. According to a preferred embodiment of the invention the additional data is a sequence of symbols.

In another aspect the invention is directed to an electronic currency system, such as Internet currency, comprising:
  at least one user connected to a network such as the Internet or a cellular telephone network;
  at least one supplier connected to said network;
  a data packets database (DPD) associated with a Currency Issuing Authority (CIA) comprising information on each and every data packed issued by said CIA;
  means for preventing or rendering difficult the electronic theft of active data packets from a user;
  software to transmit data packets from a user to a CIAS;
  one or more Currency Issuing Authority trusted servers (CIAS), said trusted servers collectively comprising:
    (1) access to the DPD of the CIA;
    (2) software to generate data packets; and
    (3) software to transmit data packets to a provider or to another user over a network, such as the Internet or other communication channel.

All that is described in this specification with respect to the Internet can, of course, be applied also to other WANs as well, such as a cellular telephone network, and the invention is intended to cover any such other WANs. Reference is made to the Internet, as the representative WAN, throughout this description, for the sake of brevity.

According to a preferred embodiment of the invention the means for preventing or rendering difficult the electronic theft of active data packets from a user comprise one or more additional data matching a set of data packets from which the data packets are taken.

In a further aspect the invention is directed to a device for automatically withdrawing electronic money, comprising electronic or magnetic storage data writing apparatus coupled with data printing apparatus. The writing apparatus can be of any suitable type, e.g., a floppy disk drive, and the writing apparatus can be a printer, a screen, or any other suitable device.

The method of the invention can also be suitably exploited to carry out transactions involving electronic purses, when the buyer and the seller are present in the flesh. The electronic purse (or wallet) of the buyer (which can be a smart-card device or a floppy disk, or any other suitable data storage device) can be inserted into a device in communication with the CIAS over a LAN or WAN, e.g., the Internet or a cellular telephone network. The CIAS is also in communication with the electronic purse (or wallet) of the seller. When the sum is to be transferred, the buyer gives instructions to the CIAS to transfer the sum from his electronic purse to that of the seller. The CIAS then validates the transaction and makes the transfer. The transaction can be further made secure by using the method of the invention and providing the additional data as a last validation step.

All the above and other characteristics and advantages of the invention will be better understood through the following illustrative and non-limitative description of preferred embodiments thereof.

BRIEF DESCRIPTION OF THE DRAWINGS

FIG. 5 shows a diskette, containing electronic currency according to one preferred embodiment of the;

DETAILED DESCRIPTION OF PREFERRED EMBODIMENTS

Figure 1:
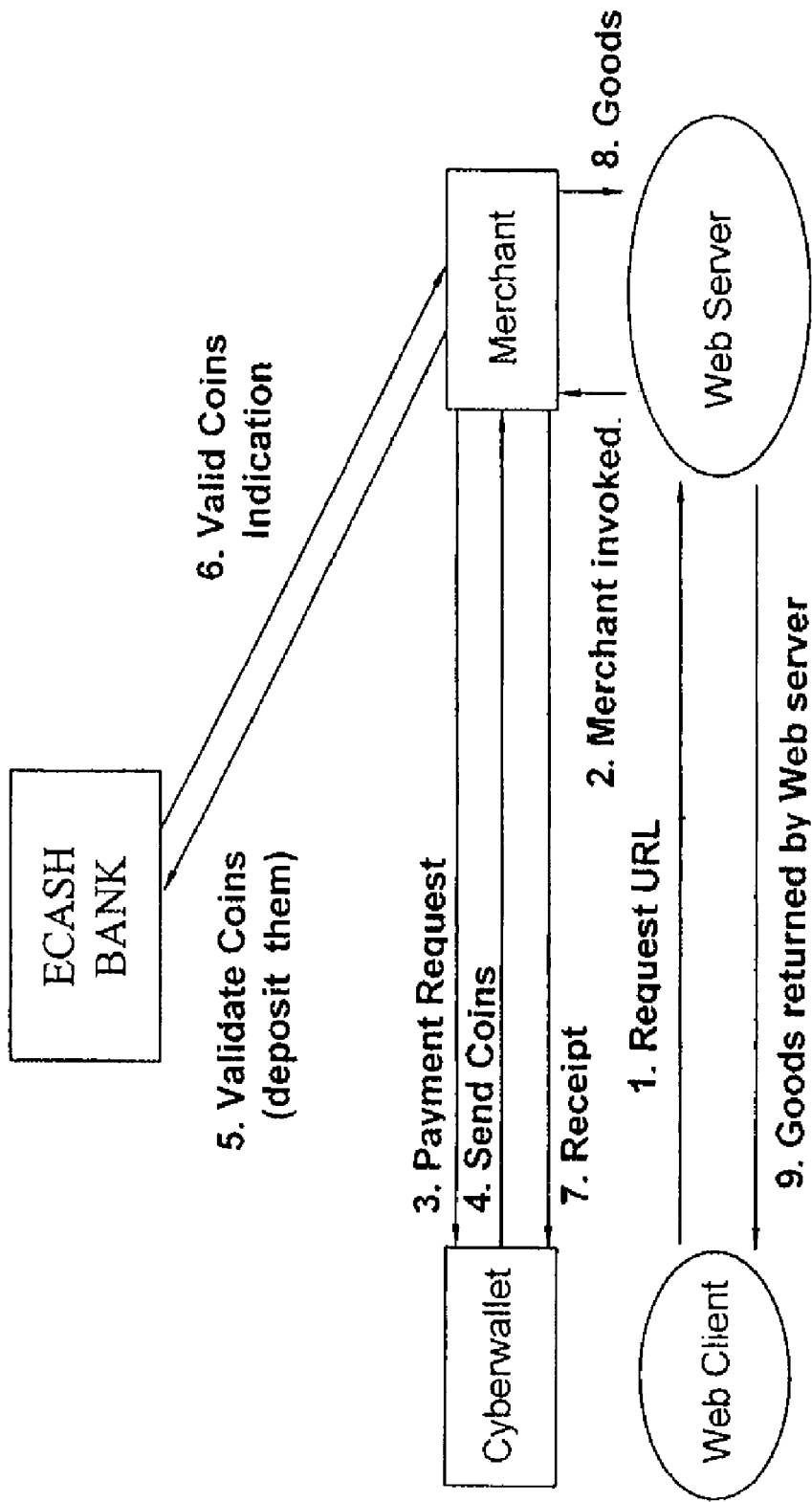
FIG. 1 schematically illustrates the making of a purchase with the prior art Ecash system.
Figure 2:
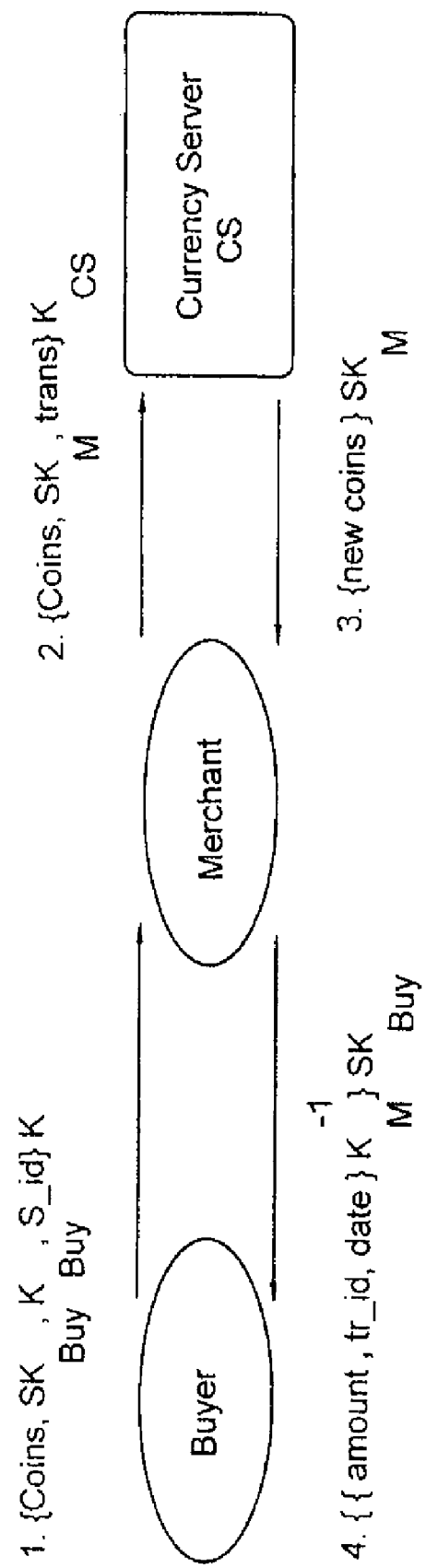
FIG. 2 schematically illustrates the making of a purchase with the prior art NetCash system.
Figure 3:
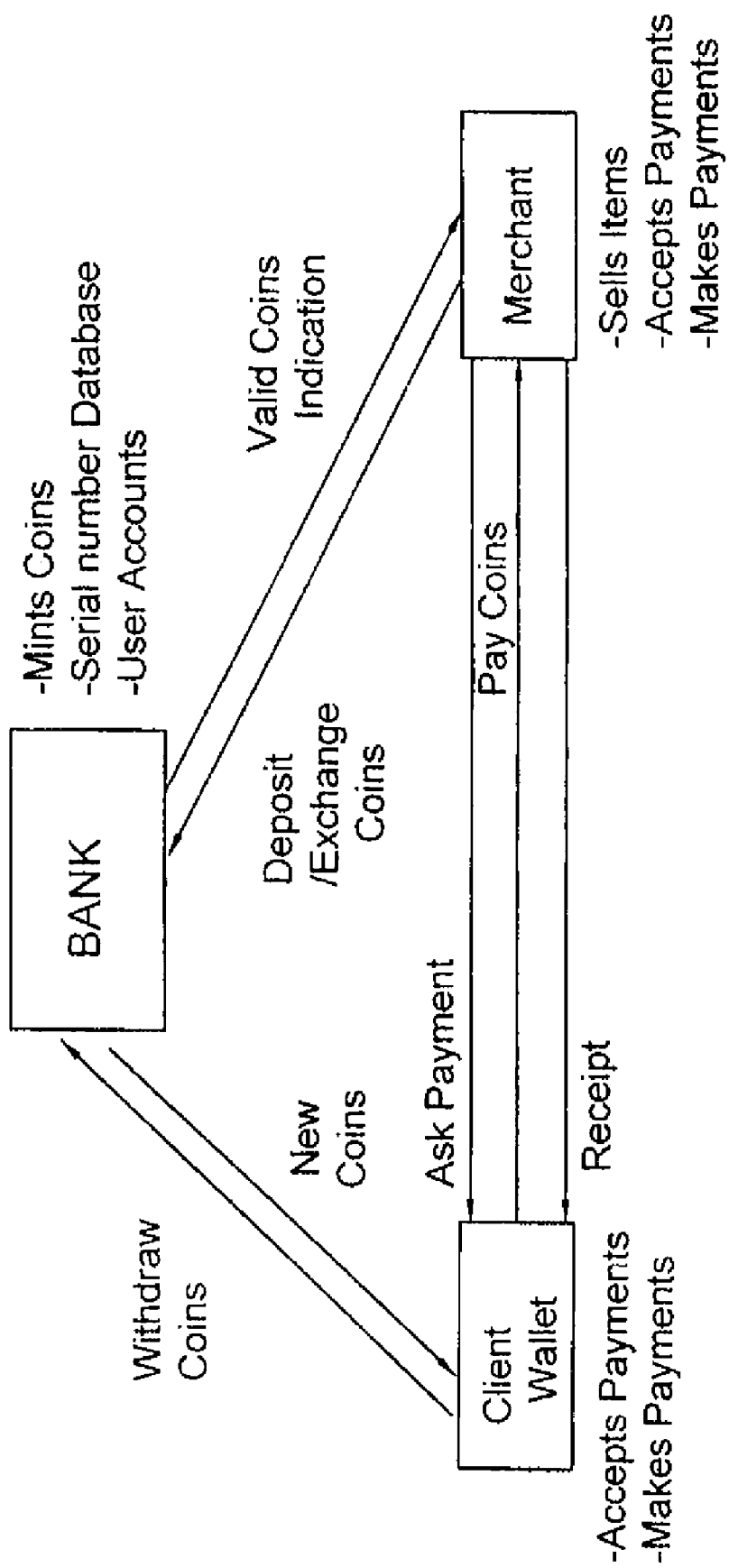
FIG. 3 schematically illustrates the basic functionality of the prior art PayMe system.
Figure 4:
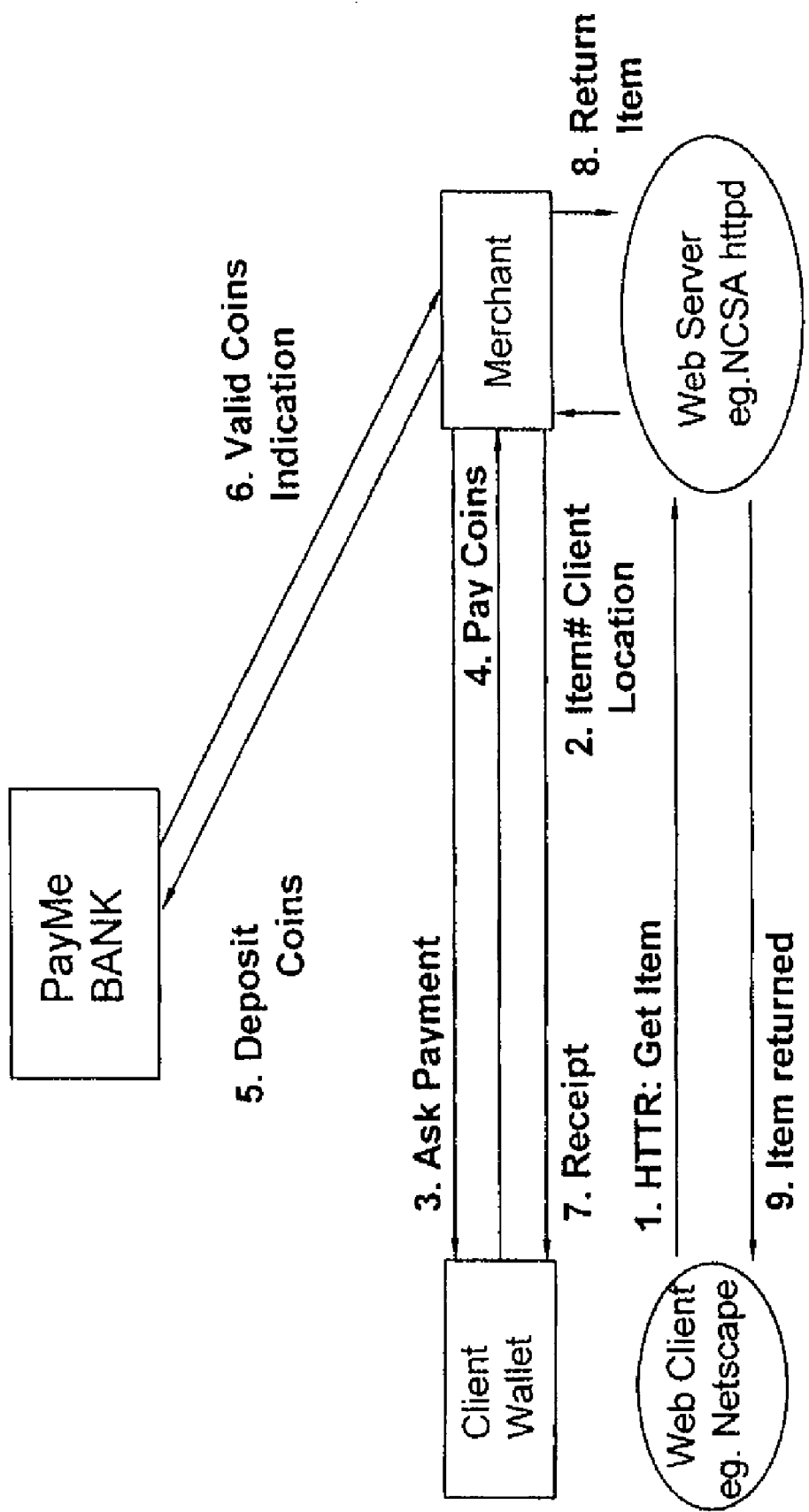
FIG. 4 schematically illustrates the making of a purchase of a Web service with the prior art PayMe system.

In the context of the present invention, the terms "electronic money" and "electronic currency", as well as "Internet money" and "Internet currency", are used interchangeably.

The system of the invention will now be described in detail, and will be referred to herein as "The System", for the sake of brevity. It resembles in many features the monetary system of a country, in which there is a currency issuing authority (CIA) that issues currency (bills, coins or money orders) to individuals. The CIA is not involved in the transactions carried out with the currency it issued, but is responsible for the value of the currency and for its maintenance. The CIA continuously examines the currency circulating on the market, replaces damaged bills, issues new bills and coins as needed, and refuses to honor counterfeit currency. Each currency unit is honored only once, viz., if a photocopy of a bill is made, it does not duplicate the buying power of the original bill.

According to The System, a CIA also exists, which functions in a similar manner, but with many improvements and with the differences that will be explained in detail below. The CIA may be a country or an organization within it, or a financial or other organization. As with the treasury of a country, the basic condition for a currency to be of value is the solvency of the CIA or of the organization it represents. There is no limitation on the number of CIAs that may issue electronic currency, and just as with countries, exchange rates can be established between different currencies issued by different CIAs.

The following detailed description of preferred embodiments of The System will further illustrate it. According to a preferred embodiment of The System the CIA issues currency consisting of electronic information, which, according to a preferred embodiment of the invention, are data packets, each data packet being associated with a specific value. The data packet can comprise a bit sequence, or a character sequence, or can comprise mixed sequences, and may further comprise data in any form that can be suitably manipulated and transferred by data transfer and manipulation apparatus. Preferably, but non-limitatively, all data packets are of equal value, since this may simplify the various processes, but of course data packets of differing values can be provided. The data packet comprises information that identifies the CIA, and which uniquely identifies the data packet. Thus, every data packet carries with it an identification that permits the CIA that has emitted it to recognize it when it reaches a CIA computer again.

Still preferably, but non limitatively, each data packet, or each set of data packets (as will be further discussed below) carries authentication data which make it possible to be reasonably certain that it has been generated by the CIA. Such authentication is well within the scope of the skilled person and may be achieved by available encryption techniques, e.g., using a private key, and therefore is not discussed herein in detail, for the sake of brevity.

The data packet, or set of data packets, can be provided in any suitable form, e.g., in magnetic form, such as on a diskette, or in optical form, e.g., on a CD-ROM, or can be transferred to the user via electronic mail or other communication method. Thus, there is no limitation whatsoever to the channel through which the electronic currency can be provided: it can be sold in a shop, or can be withdrawn from a bank, from an automatic dispenser/currency changer, or can be handed over to the user, whether in person on a removable media, or by electronic transmission, by another person. Thus, one can "borrow" electronic currency from another person to carry out a purchase, just as he would borrow a bill from a friend, to buy merchandise from a shop.

According to a preferred embodiment of The System, each set of data packets representing electronic currency will be accompanied by a software, which will be termed hereinafter "Agent", the purpose of which will become apparent from the description to follow. Alternatively, the Agent, which is universal within a given CIA, or within a given sub-type of currency or users within such CIA, and not associated to a specific set of currency (data packets), can be provided to the user from any other source, such as by downloading it from the Internet. Alternatively, an Agent available from a previous currency set can be used. The use of the Agent is not a must, since there are other ways to achieve the results provided by it, but such Agent is a particularly convenient way to operate, and therefore it is described herein by way of example, in order to illustrate this particular embodiment of The System.

Figure 5:
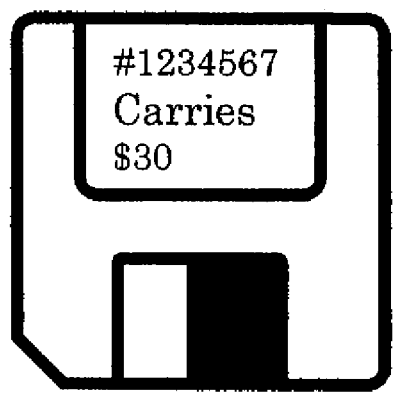
Figure 6:
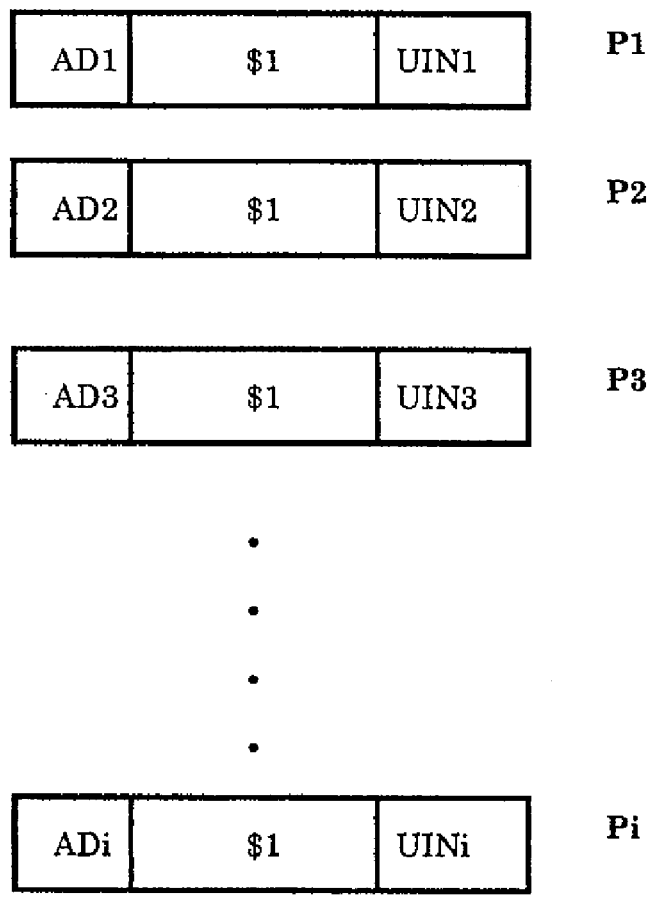
FIG. 6 schematically illustrates a "sum of electronic money" contained in the diskette of FIG. 5.

FIG. 5 shows a diskette, containing electronic currency, according to one preferred embodiment of The System, which may be any commonly employed diskette, or a smart card, which, if desired, may be marked with a serial number, for ease of reference by the user. The diskette may further be marked with information containing the amount contained (as shown in the figure), or with any other useful information. FIG. 6 schematically illustrates a "sum of electronic money" contained in the diskette of FIG. 5. The electronic currency (EC) contained in the diskette consists, according to this particular embodiment of The System, of a plurality of data packets, P1, P2 . . . Pi, having each the same value, which in the example of FIG. 6 has been preset at US$1, for the sake of simplicity. Of course, other values can also be provided, or the data packets may bear smaller values, e.g., cents. Furthermore, a plurality of data packets can be grouped into sub-groups. For instance, in the example of FIG. 6 each packet Pi, having a value of $1, may be made of 100 sub-packets of ¢1 each. For ease of handling, as will become apparent hereinafter, when paying sums above $1, each group of packets making up $1 can be treated together, and individual sub-packets can be dealt with only to complete a sum containing cents.

Each data packet Pi contains, besides data indicating its value, also a unique identificator, indicated by UINi, which uniquely identifies it among all data packets issued by the CIA, and authentication data, ADi, which can be used by the CIA, when examining a data packet, to confirm its authenticity, viz., that it has been generated by it. If sub-packets are provided, each sub-packet will be separately identified. According to a preferred embodiment of the invention, the group of sub-packets may further comprise a cumulative UIN and AD, so that if a payment requires the handling of an entire combined packet, there is no need to examine each sub-packet separately. As said, authentication methods useful for this purpose are well known in the art.

The Agent provided to the user, whether with the data packets or independently, is used, according to a preferred embodiment of The System, to allow a remote server to gain access to the area of a disk drive containing the data packets, and to operate on such data. The Agent not only assists the process in facilitating the access of the server to the data on the user's PC or the like computer, e.g., by executing appropriate communication protocols, but may also be provided with security means that prevent the server from accessing resources outside the specific electronic currency data packets area. Providing such programs which utilize resources of a PC, and which operate on data contained therein, is well within the scope of the routineer and is therefore not discussed herein in detail, for the sake of brevity. Such programs may be, for instance, Java or Active-X programs.

Of course, whenever it is stated that the CIAS accesses data on an active currency storage area, it should be understood that this also includes a situation in which the user transfers the data representative of the electronic currency to the CIAS, and the CIAS only requests the transfer to be made, without actually gaining access to, and withdrawing the data from, the user's storage. This mode is, of course, equivalent to the mode in which the CIAS withdraws the currency, since the only important result is that the currency reaches the CIA.

Data packet areas may be of several types. For the purpose of clarity, the following exemplary data packet areas are defined:

"Active data packet area": This is an area located in any data storage area suitable for input/output operations, containing electronic money intended for use. This area is accessible to the CIA (as will be further explained below), either by the action of the Agent, or by any other suitable method, e.g., by transfer to the CIA by the user, as discussed above. The user may transfer electronic money to this area from any other data areas, such as a storage data packet area, or from outside sources;

"Storage data packet area": This is an area in which the user stores valid electronic currency for non-immediate use. This area is not accessible to the CIA;

"Back-up data packet area": This is an area in which the user stores duplicates of valid electronic currency, as a safety against data corruption, accidental deletion or other possible problems with the currency kept in either the active data packet area or the storage data packet area. This area is not accessible to the CIA;

"Archive data packet area": This is an area in which active records of spend electronic money are kept. The records may contain information on the amount spent, the date and time of the transaction, the identification of the provider to which the money has been transferred, the identification of the specific CIA server that handled the transaction, etc. This area is accessible to the CTA, if the user so desires.

Data packet areas may exist in any suitable form and location, such as on the hard disk drive of the user's PC, on a diskette used in a diskette drive of the PC, in a remote storage medium, such as a hard-disk drive associated with a remote computer, or any other suitable data storage means, provided the data packet areas that have to be accessible to the CIA are connected, or can be connected when needed, in any suitable way to a LAN or WAN, such as the Internet.

The Agent can further function as the program that actually cooperates in the transfer of the paid sum from the user to the provider of services or goods. Alternatively, however, a separate payment program may be provided, the purpose of which will be explained below.

Figure 7:
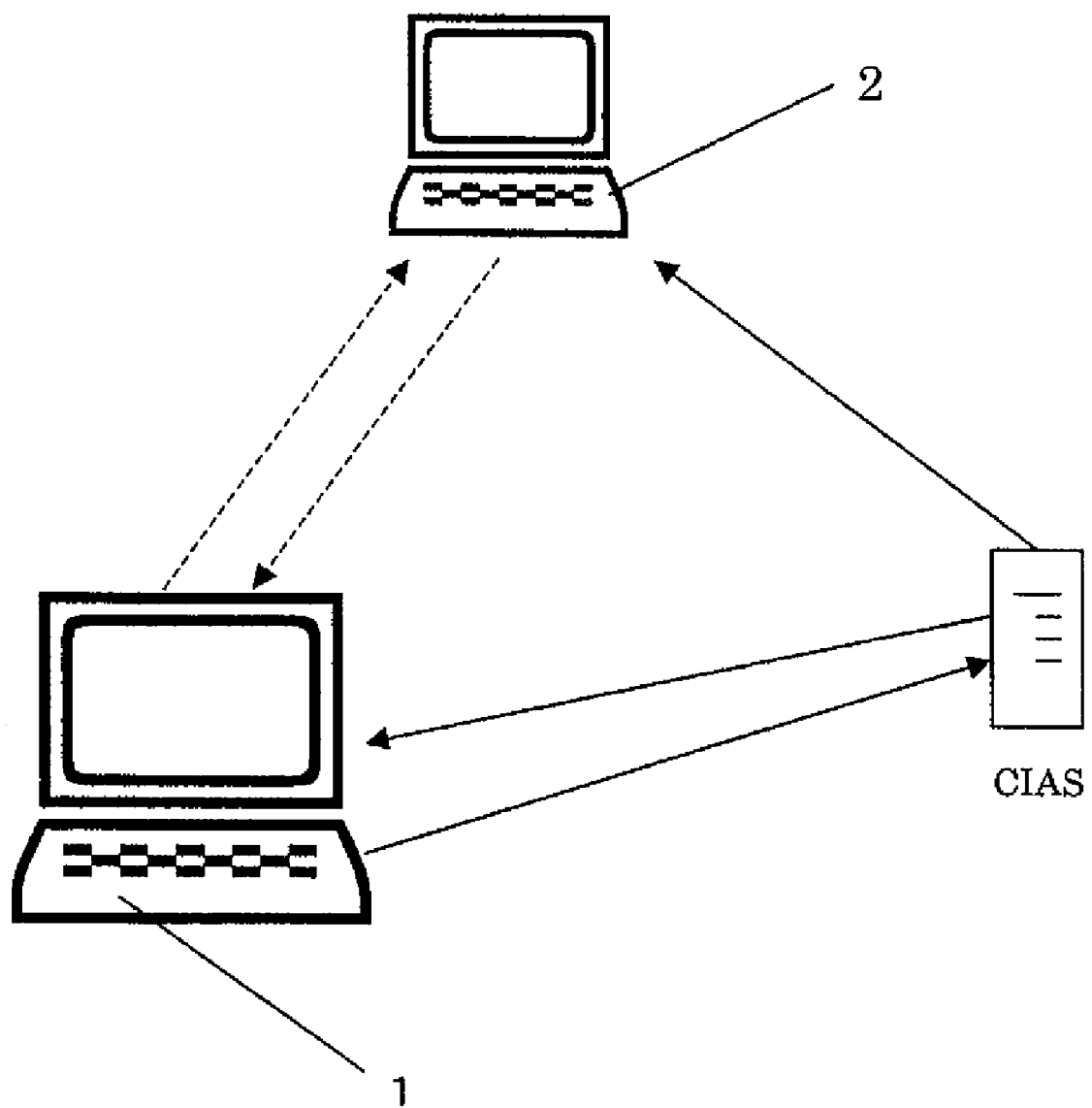
FIG. 7 is a schematic representation of a transaction involving electronic currency, according to a preferred embodiment of the invention.

Looking now at FIG. 7, a schematic representation of a transaction involving electronic money which, in this example, is Internet currency, is given. A user, 1, interacts with a provider, 2, via the Internet (broken arrows). When a transaction has been decided upon, and the time comes to effect actual payment, the user 1 "effects payment", by providing its terminal or PC (or any other external or internal device) with instructions to transfer the required sum to provider 2. These instructions can be given using a payment program, which can be incorporated in the Agent or may be a separate program. Once the instructions to pay have been given, the payment program contacts a separate server, which is a server belonging to the CIA, and under the sole control of the CIA, indicated as CIAS in the figure. The CIAS has available to it all information on data packets issued by it, and is provided with means for verifying the authenticity of the data packet.

Upon receipt of the instructions of user 1 to pay a given sum to provider 2, the CIAS accesses the active data packets area of user 1, using the Agent as explained above, and deletes the data packets representing the indicated sum from the specified area, or deactivates them (e.g., by inserting a private code in their header), after having copied them to a local memory. The procedure involved in this step will be further explained below with reference to FIG. 8. Alternatively, of course, the Agent or payment program transfers the currency to the CIA and deals with the steps of marking the spent currency as invalidated. Of course, any other alternative procedure is possible, and many alternative procedures for such data transfer can be devised by the skilled person.

The CIAS now examines the data packets which together provide the payment, and verifies their authenticity. It further verifies that the data packages have not been previously used to effect a payment, by comparing their UINs with a database of previous transactions. If the packets satisfy both conditions, namely, they are authentic and have not been previously used, the CIAS transmits the sum they represent to provider 2. According to a preferred embodiment of The System, the transfer is effected by invalidating the data packets used by user 1, and by issuing a new set of data packets, for the same value, to provider 2. In this way, each data packet can be used only once for payment purposes, and once it has been used it is marked as spent in the CIA database, so that it cannot be used again.

According to a preferred embodiment of The System, in order to facilitate record keeping, the CIAS also writes suitable information on the transaction in the archive data packets area of the user, as explained above.

During this transaction, the CIAS can also charge user 1 and/or provider 2 a commission for the service, e.g., by withdrawing from the data packets area of user 1 a sum or percentage in excess of the payment made, and/or by transmitting to provider 2 the paid sum, less a predetermined sum or percentage. Of course, the imposition of a commission will be regulated by predetermined rules between the CIA and its customers.

In this way, user 1 is safe, since its active data packet area can be accessed only by a trusted server, i.e., the CIAS, and since the user may decide what amounts he will keep in such area from time to time, leaving in the accessible area only the needed sums of money. The provider 2, on the other hand, is secure since it receives its payment from the CIA, and this payment is tantamount to the issuance of new money from the issuing authority. Thus, any payment received from the CIAS is, in fact, a cash payment and the provider is not concerned with any questions of solvency of the user. The CIA, on the other hand, is secure, since every transaction requires that the currency employed be examined by a CIA Server, so that full control of all the "money" circulating in the Internet, originating from the specific CIA, is in the CIA's hands. Since payments are made in small units (the data packets), and since every unit is unique and identifiable, the CIA has full control over forgery, theft etc., as will be elaborated in greater details hereinafter.

The currency and method of The System provide great safety and flexibility to the user. Some illustrative important features of the system will be discussed below.

Safety Against Losses and Crashes

The currency of the invention can be copied. Thus, a user may make a copy of currency purchased, e.g., in a diskette, on another diskette or on its hard disk (i.e., in the back-up data packet area). Since each data packet can be used only once, it does not matter how many copies are made. Once a data packet has been spent, it cannot be used again. If, on the other hand, a data packet has been lost, a copy can be used and will be honored by the CIAS.

Safety Against Theft

Currency can be stolen from a user, just as bills or coins can be stolen. However, if a user fears that a set of data packets has been stolen from him, he may notify the CIAS of the theft, presenting a copy of the data packets, and have the set of data packets invalidated and a new set re-issued to him. This procedure would often involve an identification of the user, so as to be able to locate him, should any person claim a legitimate ownership in the set of data packets. Furthermore, a deposit of Internet money may be required of the user, for a short period of time, to ensure the payment of any such sum to a rightful claimant. This sum may be automatically remitted to the user, after the expiration of the deposit period, on his next connection to a CIAS. The CIAS will then add this sum to the active data packet area, and notify the user.

Additionally, as said, currency will normally be purchased in batches of data packets. Such batches can be identified by a number as shown, for instance, with reference to the diskette of FIG. 5. A user may request that a new batch of data packets be issued to him, by providing such number to the CIAS, just as one would request the change of damaged bills from a bank. The CIAS will then check that none of the data packets corresponding to such batch has been used in a transaction, and will issue a replacement set for the entire set or for that portion of the set that has not yet been used and is still valid. Again, a temporary deposit may be required for such transaction.

A main protection against theft, however, is that no direct contact exists between the user's electronic money and the provider which receives payment. All transactions pass through the CIAS, which prevents any direct contact with untrusted servers, and thus any simple possibility of theft.

Another main protection, however, lies in that the sums of money involved will typically be small. Internet users will usually not purchase motorcars using Internet money, since there are better and safer ways to effect transactions involving large amounts of money. Most purchases over the Internet range between a few dollars to a few tens of dollars, or even above one hundred dollars. Since the amounts of money involved in the transactions are very small, and, when operating according to the invention, the difficulty in organizing a theft is very great, there is no real incentive for theft, since no rewarding amounts can be stolen.

However, using the method and system of the present invention, transactions involving larger amounts of money can also be securely made.

Anonymity

One great disadvantage of most prior art systems is that they require to open accounts, or at best to use personal keys to generate cash money. This limits the level of actual anonymity that can be achieved. According to The System, all Internet money is "to the bearer", and bears no identification of the user whatsoever. The money paid by a user does not reach the provider to which it is paid, since the CIAS generates a new set of data packets, which is provided to the provider, to match the amount paid by the user. Thus, the CIAS functions, in this sense, as a total isolation between the user and the provider.

The Agent or the like program provided to the user may generate a temporary user identification, valid for the monetary transaction, which will permit the provider to know when the money has actually been paid to it by the user. Thus, in the illustrative example of FIG. 7, the Agent may either generate an ephemeral user identification (UserID), and transmit it to the CIAS, or may receive the UserID from the CIAS. The user then transmits its ephemeral UserID to the provider, which matches it with the UserID transmitted to it by the CIAS, together with the payment. Thus, the provider 2 knows when the payment made by user 1 has reached it. The ephemeral UserID will preferably be generated anew for each transaction, so that no UserID is used twice for different transactions.

Delayed Payment

According to the known art, there is no practical way to effect transactions over the Internet that involve a delayed payment. However, certain providers may be willing to provide services or goods against a payment delayed by an agreed time period. The System permits to achieve this result, since the whole procedure described with reference to FIG. 7 may be carried out, with the exception that the currency is not transmitted to the provider by the CIAS until the agreed date. Instead, a confirmation is provided by the CIAS to the provider that the sum due to it has reached the CIAS and is available, to be delivered to the provider at the agreed date.

This procedure can be important, for instance, when items are sold to a user who wishes to receive them before irreversibly paying for them. Thus, if the promised item is not received by the agreed date, the user may protest the payment with the CIAS, and delay the actual transfer of the funds to the provider pending the receipt of the goods. This option is somewhat similar to the payment by postdated check.

Simultaneous Payment and Receipt of Service

The System further provides an option that is not available at all according to the prior art. This option is the payment of a sum in a continuous manner, simultaneously with the receipt of the services for which the user is paying. A simple example is the viewing of a movie. A provider may offer the option to view a full movie for a sum, and to stop viewing after a predetermined period of time, by paying the proportional amount of money for the part viewed before stopping. According to this mode of operation, the CIAS will receive, as a part of the details of payment, the total sum and the time intervals at which fractions of the sum have to be paid. The CIAS will then transfer to the provider the fractions of the sum, at the given intervals. The provider will continue to permit the viewing of the movie as long as said fractions of the total sum are received at the specified intervals, and will stop the viewing if the payment stops. The user, on the other hand, may stop the payment to the CIAS, whenever he decides to stop viewing the movie, which will cause an interruption of the movie.

Of course, this simple example may be applied to a variety of service, and the method according to this preferred embodiment of The System is applicable to every situation in which partial services can be provided, the payment for which is proportional to the passing of time. Another illustrative example of such a service may be a game played over the Internet, where the user may play for as long as he wishes, and may stop playing when he decides that he has played enough. In this case, as long as the user wishes to play he will allow the stream of data packets flowing to the CIAS at the predetermined time intervals, and will stop such flow of data packets whenever he decides to quit the game.

Many other time-based services are expected to be available over the Internet, as the available bandwidth increases, and the pay-per-time mode available according to this particular embodiment of the invention may streamline all such processes, by avoiding the need to collect payment long after the service has been provided, and by permitting the user to allocate a finite sum to be used for a given purpose. Once the available sum in the active data packet area is exhausted, the service will be stopped.

Payment Record

As explained above, with each transaction, such as payment of currency exchange (as described below) the CIAS copies the relevant data packets to its memory and deletes them from the user's data packet area (or marks them as used). Alternatively, these operations are effected by an Agent or payment program. It should be noted that deleting the data packets from the user's active data packet area is not a must, since once copied to the CIAS memory and invalidated a data packet cannot be used again. However, for the convenience of the user it is preferred not to leave spent data packets in the active area. An alternative to altogether deleting spent data packets from the user's or holder's active data packets area, is to transfer them to a "spent" area of the user's data packets storage area (the archive data packet area), in which case it is also possible to add to them additional information concerning the transaction, the identity of the provider to which the data packet has been transferred, the date and time of the transaction, etc., as already explained above. This may be convenient for the purpose of record keeping.

Another advantage of The System, in this respect, is that complete records of data packets used can be kept, since every data packet or batch of data packets can be copied and saved for later reference.

Cash Conversion

The electronic money according to The System is actual currency. The value of the currency is indisputable, as long as the CIA is a reputable agency, such as a government agency, a bank or the like organization. Whoever holds valid data packets can convert them into another currency by cashing them with the CIA. Such other currency may be solid currency, e.g., U.S. Dollar or Euro, or any other currency, including other Internet currencies emitted by other CIAs.

Figure 8:
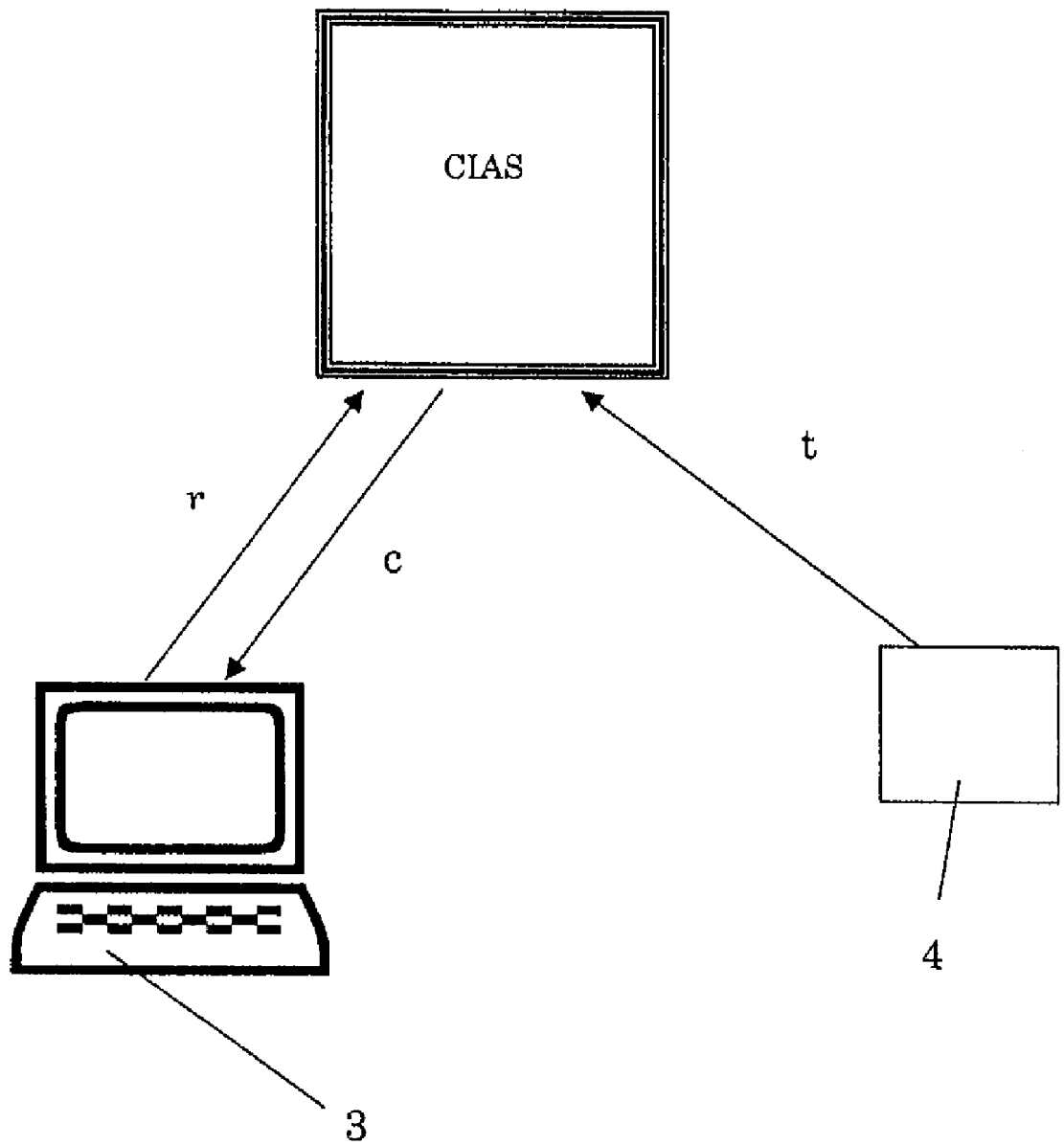
FIG. 8 schematically illustrates a process, according to a preferred embodiment of the, by which the holder of data packets converts them into another currency.

Whenever the holder of the data packets wishes to convert them, he goes through a process similar to that described with reference to FIG. 7, as shown in FIG. 8. The holder, 3, contacts a CIAS with the request of currency exchange (arrow "r"). The CIAS then accesses the accessible data packet area of the holder 3, and "withdraws" the specified amount of money. Withdrawal can be carried out in a variety of ways, as will be apparent to the skilled person, but a preferred mode is that described hereinbefore, in which the CIAS copies the relevant data packets to its memory and deletes them from the holder's active data packets area (arrow "c"). Again, this process can be effected by an Agent or payment program, which transmits the relevant data packets to the CIAS and carries out any other desired operation within the data areas.

At this stage, the CIAS runs the aforementioned checks on the data packets, viz., it verifies that each data packet is authentic and has been issued by the relevant CIA, and further that no data packet has been used before in any transaction since its issuance by the CIA. Any data packet found to be faulty can be dealt with separately, but its value will not be paid into the holder's account, 4, as long as the nature of the problem has not been determined and the problem corrected.

The cumulative value of all valid data packets is then paid into the holder's specified account 4 (arrow "t").

The account 4 may be a physical account, e.g., a bank account, or an account with an organization, e.g., another CIA, or account 4 may be a different active data packets area belonging to a different CIA, in which case account 4 may be or not physically located on the same PC or other a storage means of holder 3, from which the withdrawal has been made.

User's Activities

A great advantage of The System is that it does not require the user to carry out activities substantially different from those carried out by him regularly. Once the user exchanges regular money for electronic money, he can decide whether to copy it all, or part of it, into the active data packet area (ADPA) of his hard disk drive, or whether to use its diskette drive as the ADPA. Utilities for copying and transferring data packets from data storage, backups, etc., are simple to devise for each case, and well within the skill of the routineer.

A user who has accumulated a large number of data packets, e.g., through e-commerce, and wishes to exchange it for hard currency, may go to a selling agent, e.g., the kiosk or bank from which he normally purchases electronic money, and exchange it for bills or other currency. In this case, the selling agent functions as the holder 3 of FIG. 8, where the data packets he transmits to the CIAS belong to the holder. The selling agent will pay the relevant amount in the hands of the user, less his commission, if any, after the CIAS transfers the value of the data packets to its account 4. Such transfer may, of course, consist of new data packets which have been generated instead of those exchanged by the user.

Quick Response

Since the operations performed by the CIAS are simple, as compared with prior art systems, the transaction can be completed very quickly. Of course, the CIA may operate a plurality of CIAS, so that transactions are carried out swiftly all over the net. The CIA will then coordinate the operations carried out at the various CIASs, to ensure that every CIAS is updated with information about data packets that have been invalidated by other CIASs.

Figure 9:
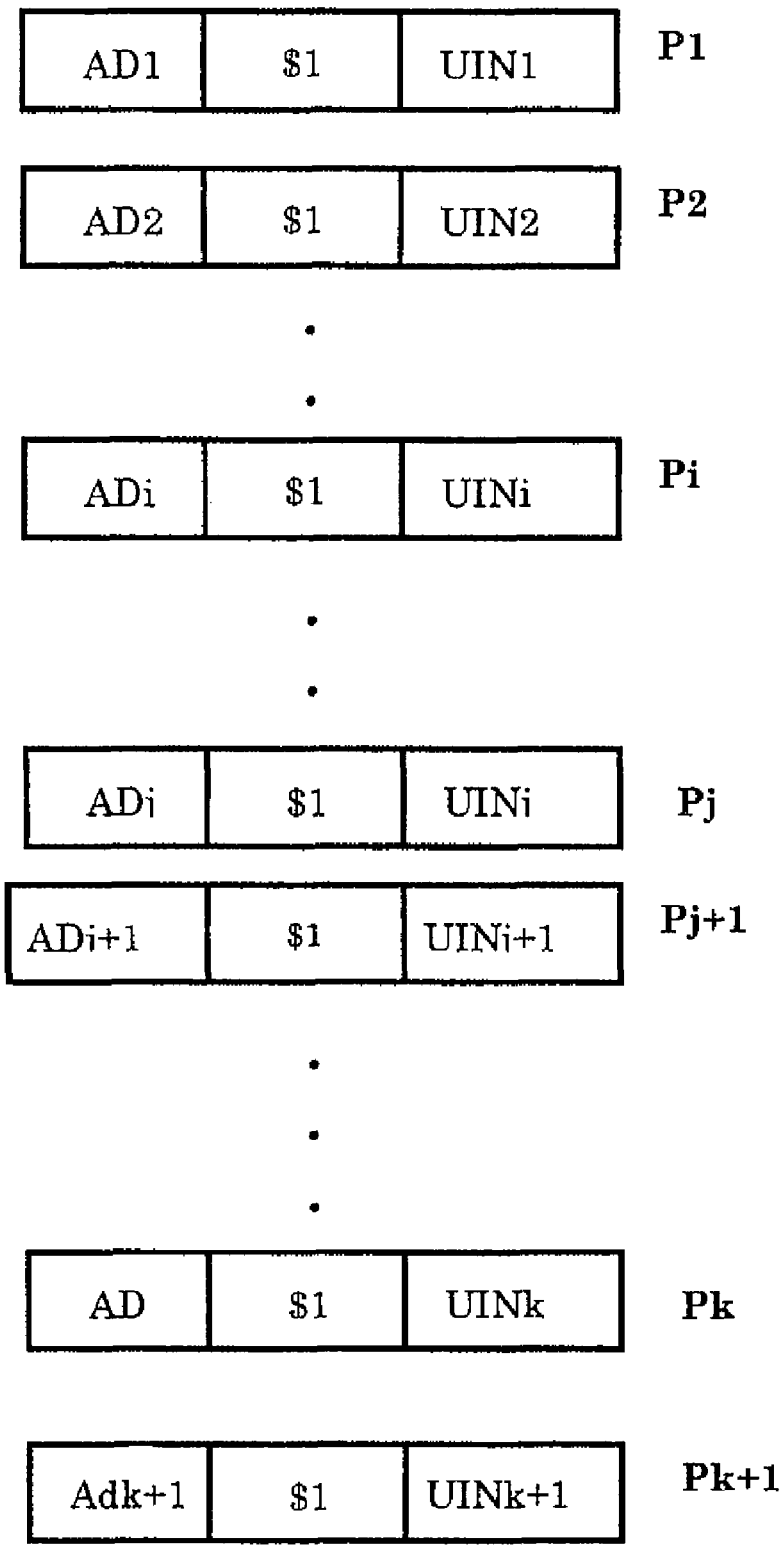
FIG. 9 schematically illustrates a "sum of electronic money" consisting of a set of data packets, containing a plurality of data packets.

Turning now to FIG. 9, a set of data packets according to another preferred embodiment of the invention is illustrated, which is essentially the same as that of FIG. 6. However, the authentication data, ADi, or the Unique Identificator, UINi, or a separate matching identificator (not shown) contain data suitable to match the data contained in the set of data packets, or the set itself, with additional data. In this illustrative example the additional data consists of the strings of characters shown in FIG. 10.

Assuming now that a first payment is to be made, consisting of the data packets P1 to Pi, these data packets are transmitted to the CIAS, either through an appropriate payment program or Agent, or by allowing the CIAS to withdraw them directly from the active data packet area. Conveniently (but not compulsorily), these data packets are marked in the user's storage area as "spent". The CIAS now checks in its data base that 1) the data packets have been issued by its CIA; 2) that the data packets have not been used before in a transaction; and 3) if needed (e.g., if the data is transmitted by the user to the CIAS) that the sum corresponds to the required sum. If these checks give a positive result, the CIAS carries out the following additional steps (in any suitable order): 4) it marks the data packets involved in the transaction as "spent" in its data base and invalidates them; 5) requests from the user additional data to activate the data packets.

Figure 10:
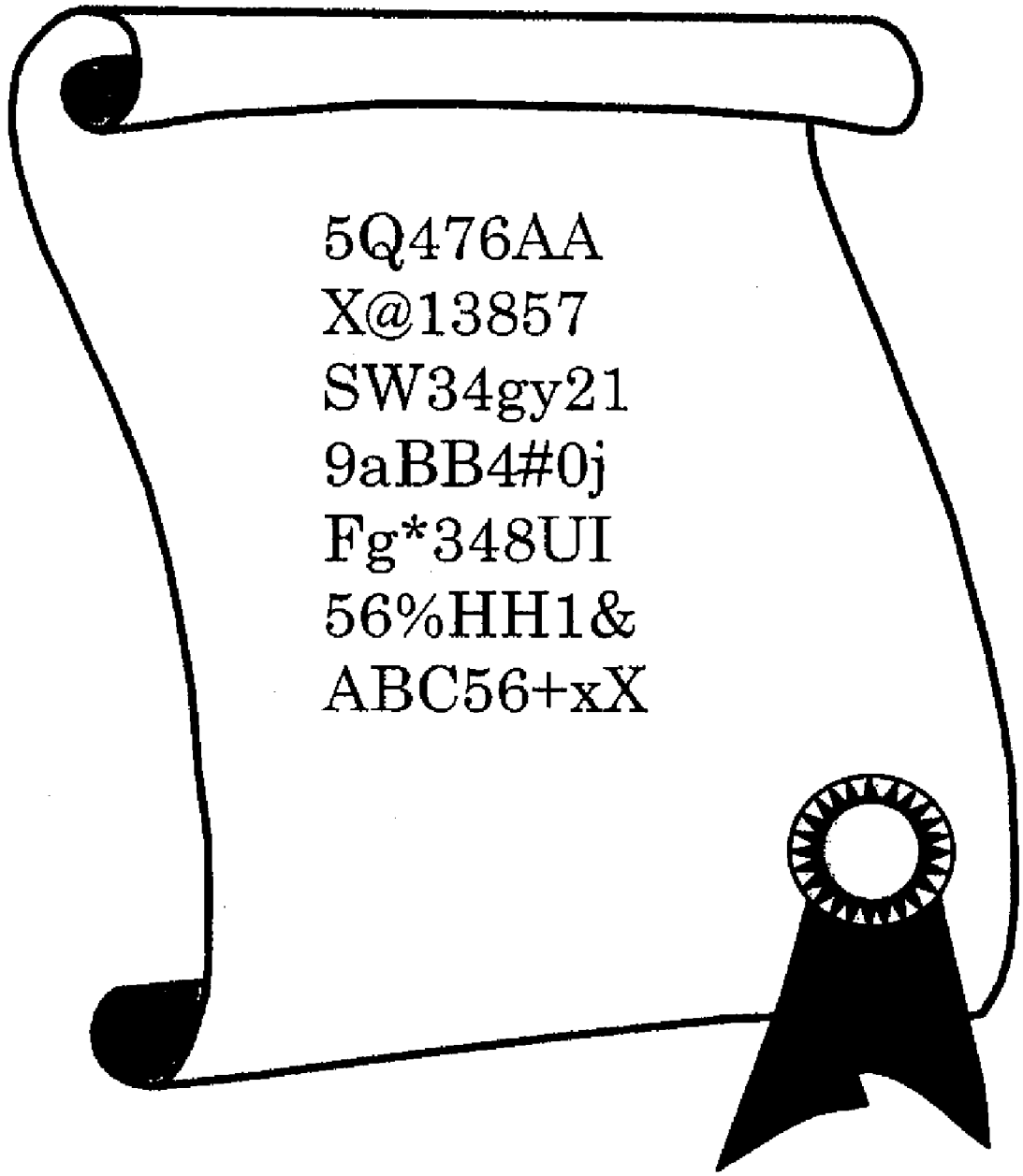
FIG. 10 illustrates additional data to be used in the example to follow.

The user chooses one of the strings of FIG. 10, e.g., the first string 5Q476AA, and inputs it to his computer. The string 5Q476AA, as well as all other individual strings in FIG. 10

(according to this illustrative example) are matched with the set of data packets from which the data packets involved in the current transaction are involved. The matching may be, for instance, the result of a calculation, such as an algorithm that generated the strings of FIG. 10 on the basis of a common portion of the UINs of the packets of FIG. 9, or the UIN of the entire set of data packets (not shown in FIG. 9), or may be a set of character strings, whether random or not, that have been generated at the time the data packets have been generated and/or supplied to the user, and which are matched with the data packets of the set in the CIA database, by means of a look-up table. Other matching techniques can of course also be used.

Once the matching has been verified, the CIAS performs the following additional steps: 6) it finalizes the transaction and allocates and/or transmits the sum due to the recipient (typically, the supplier); and 7) it voids the string 5Q476AA as a string suitable to validate a data packet coming from the set of FIG. 9.

When the user wishes to make a further payment using, say, data packets Pj and Pj+1 of FIG. 9, he and the CIAS repeat the procedure described above, but this time the user must select a string (any string from FIG. 10) other than 5Q476AA, in order to validate this second payment.

Let us examine what an electronic thief can do in the system exemplified above. He can copy the whole set of data packets, but cannot use it because he does not possess the strings of FIG. 10, which are not available on the user's computer, and which have been provided to him by other vehicles (by a printer, on the data packets diskette, by fax, orally, etc). The strings of FIG. 10 are known only to the user and to the CIAS, and without them this set of data packets is useless.

At the time the transaction is effected, even if the thief is very quick, he cannot use the additional data (the string) to any useful end, because the CIAS will not require the string as long as the data packet has not been provisionally validated. At that point, the CIAS will accept the use of one data string for the validation only of the specific pre-validated data packets. Even if the electronic thief is already in a pre-validation stage, he cannot use the string input by the user, since it cannot be used to finalize the validation of two data packets from the same set. It is an easy task to ensure that the validation of two sub-sets of data packets from the same set be always effected sequentially, and the user, who is the only one to know the additional data string, will therefore always be the first to use it and cause it to become spent.

On the other hand, the theft of the remaining data packets from a partially utilized set will be of no use to the thief, since he possesses no knowledge of the additional data.

This system, therefore, is entirely electronic thief proof.

As will be appreciated by the skilled person, the strings of FIG. 10 are a mere example, and have been chosen to be of 8 characters, and 7 in number, for the sake of simplicity. Of course, any length of sequence can be used, and as many alternative additional data string can be provided to the user, to enable him to make several partial payments from a given set of data packets.

Using the Electronic Purse in Shops

Figure 11:
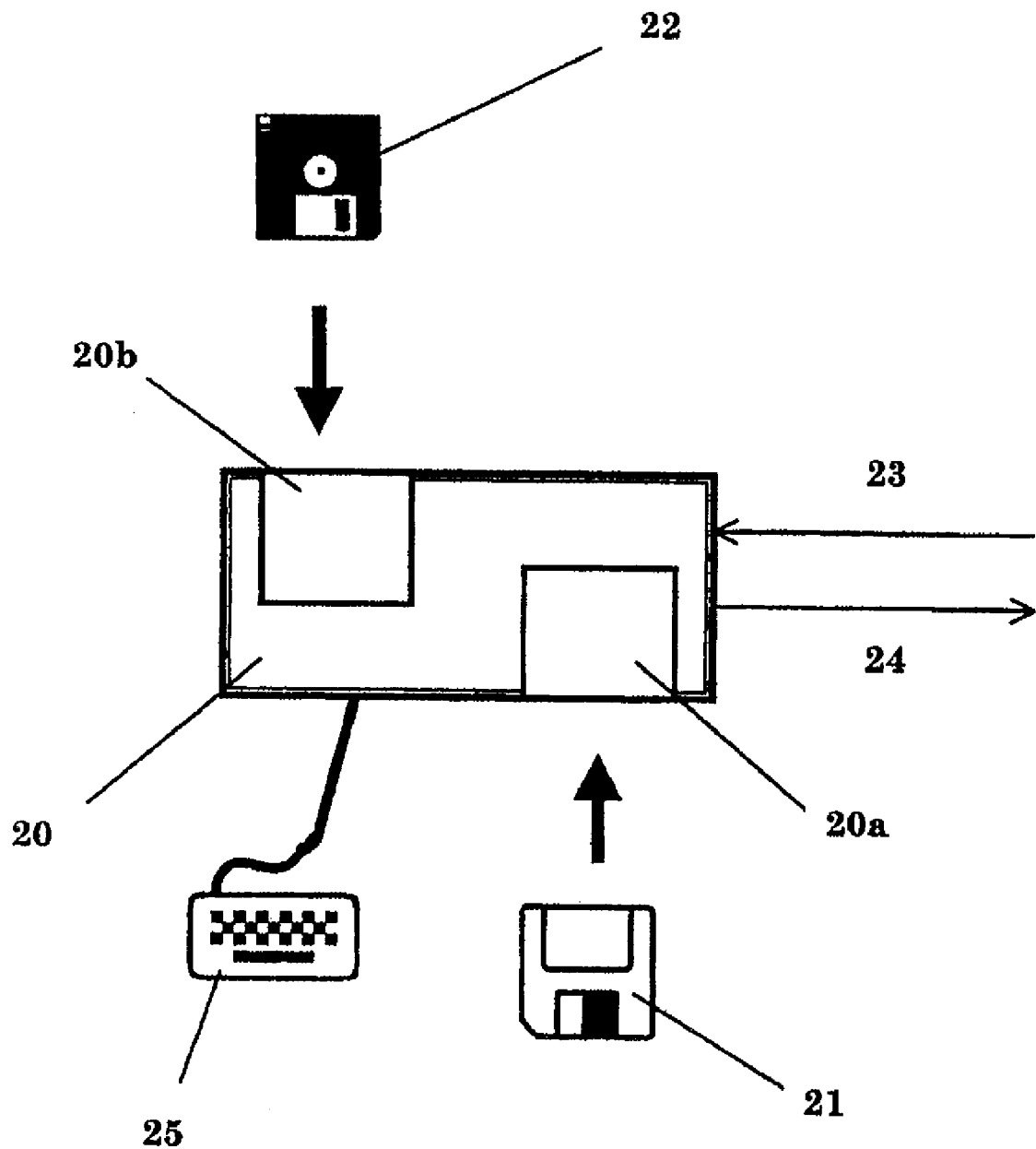
FIG. 11 schematically illustrates the use of the invention during a physical transaction, e.g., in a shop.

The use of the invention during physical transaction, e.g., in a shop, is schematically illustrated in FIG. 11. A device 20, termed hereinafter "exchange box", is provided in the shop, and has a customer disk drive 20a, to house the electronic purse 21 of the customer, and a seller disk drive 20b, to house the electronic purse 22 of the seller. The seller's disk drive 20b, and his electronic purse 22, can be replaced by any other suitable arrangement, such as a local or remote hard disk drive or other storage means, to receive and store the electronic currency.

The box 20 is further provided, in this example, with a keyboard 25, and may further comprise display means (not shown in the figure).

Exchange box 20 is provided with terminal means needed for effecting the transaction. Box 20 is connected to a CIAS via input/output lines 23/24 (which may be the same connection line). Connection to the CIAS may be effected by a variety of ways. For instance, box 20 may be continuously connected to the CIAS via the Internet, or may connect by dial-up when effecting a transaction, or may be a part of a LAN. In the last two cases, it may be possible, under appropriate conditions, to dispense with the use of the additional data. However, in the following example, the use of additional data will be illustrated.

When the customer wishes to carry out a transaction, he inserts his electronic purse 21 into drive 20a of exchange box 20. If needed (viz., if no other electronic currency receiving means are provided, as explained above), the seller also introduces his electronic purse 22 into its corresponding drive 20b. Box 20 then establishes communication with a CIAS, via communication line(s) 23/24), and inputs the details of the transaction (e.g., through keyboard 25). The CIAS then checks the electronic currency present in, or supplied from, the buyer's electronic purse 21, and pre-validates it as previously explained. At this stage, once the CIAS confirms that the pre-validation procedure has been completed, the customer inputs the additional data via keyboard 25. The CIAS completes the validation of the transaction using the additional data, and transmits to the seller's purse 22 the relative amount, in newly generated money, less any commission. The seller may chose any suitable method for receiving the additional data relating to the newly generated money, e.g., may chose to receive it at the end of the day, or in batches, for instance, by separate print-out or by fax. For convenience of the seller all money generated by a CIA during a given period of time, e.g., one working day, may be generated as a single set, using the same set of additional data, or the sets may be consolidated at the end of any given period. Alternatively, the amounts paid may be deposited in a bank account of the seller, or may be kept in escrow for the seller by the CIAS which may issue temporary money certificates.

While embodiments of the invention have been described by way of illustration, it will be understood that the invention can be carried out by persons skilled in the art with many modifications, variations and adaptations, without departing from its spirit or exceeding the scope of the claims. For instance, other networks can be used instead of the Internet, many different data manipulation methods and procedures can be devised, and many different programs, security means and accessories can be used, all without exceeding the scope of the invention.

The invention claimed is:

1. A system for effecting transactions over a network, comprising
at least one isolation server and
a first communication device, associated with a first user, connected over the network for communication purposes;
a second communication device, associated with a second user, connected over the network for communication purposes;
the first communication device and the second communication device are isolatedly connected to one another through said isolation server for the purpose of indirectly exchanging electronic money from the first user to the second user, wherein the first user is provided with money-representing data packets in a first active data packet area located in a first storage area associated with said first user, wherein the money-representing data packets are issued by a Currency Issuing Authority (CIA), a Currency Issuing Authority trusted server (CIAS) programmed to receive an instruction from the first user to pay the second user a first monetary sum and in response to the instruction the CIAS is programmed to (i) delete one or more money-representing data packets in the first active data packets area or (ii) mark one or more money-representing data packets in the first active data packets area as spent; and a data packets database (DPD) associated with the first user comprising money-representing data packets;

said CIAS collectively comprising:
 a) access to the first user's DPD containing money-representing data packets; and
 b) software to generate new money-representing data packets and deliver to the second user the new money-representing data packets having a monetary value equal to or less than the first monetary sum.

2. The system according to claim 1, wherein the network is the Internet.

3. The system according to claim 1, wherein the network is a cellular phone network.

4. The system according to claim 1, wherein the CIA comprises one or more computers with memory having computer executable instructions stored therein for performing a method comprising:
 generating one or more new money-representing data packets;
 issuing said new money-representing data packets to the first user;
 storing information in the memory on nonuse of the issued money-representing data packets;
 accessing information generated by the first user, representing a transfer of the first monetary sum from said first user to the second user; and
 generating at least one new money-representing data packet, having a maximum value of the first monetary sum, and compensating the second user with the new money-representing data packet;
 wherein the first and second users are isolated from one another at least during the information accessing step and the generating and compensating step.

5. The system of claim 4, wherein the CIA further comprises a software agent comprising executable instructions for:
 configuring a first user active data packet area;
 storing each money-representing data packet in the first user's active data packet area; and
 granting the CIAS access to the first user's active data packet area for manipulating money-representing data packets therein.

6. The system according to claim 1 wherein the one or more money-representing data packets in the first active data packets area that are deleted or marked as spent are equal to at least the first monetary sum.

7. A system for effecting transactions over a network, comprising
 at least one isolation server and
 a first communication device for connecting a first user over the network with said isolation server for communication purposes;
 a second communication device for connecting a second user over the network with said isolation server for communication purposes;
 wherein the first user and the second user are isolatedly connected to one another through said isolation server for the purpose of indirectly exchanging electronic money from the first user to the second user, and wherein the first user is provided with money-representing data packets in a first active data packet area located in a first storage area associated with said first user, wherein the money-representing data packets are issued by a Currency Issuing Authority (CIA), and
 a Currency Issuing Authority trusted server (CIAS) programmed to receive an instruction from the first user to pay the second user a first monetary sum and in response to the instruction the CIAS is programmed to (i) delete one or more money-representing data packets, equal to at least the first monetary sum, in the first active data packets area or (ii) mark one or more money-representing data packets, equal to at least the first monetary sum, in the first active data packets area as spent; and
 a data packets database (DPD) associated with the first user comprising money-representing data packets;
 said CIAS collectively comprising:
  a) access to the first user's DPD containing money-representing data packets; and
  b) software to generate new money-representing data packets and deliver to the second user the new money-representing data packets having a monetary value equal to or less than the first monetary sum.

8. The system according to claim 7, wherein the network is the Internet.

9. The system according to claim 7, wherein the network is a cellular phone network.

10. The system according to claim 7, wherein the CIA comprises one or more computers with memory having computer executable instructions stored therein for performing a method comprising:
 generating one or more new money-representing data packets;
 issuing said new money-representing data packets to the first user;
 storing information in the memory on nonuse of the issued money-representing data packets;
 accessing information generated by the first user, representing a transfer of the first monetary sum from said first user to the second user; and
 generating at least one new money-representing data packet, having a maximum value of the first monetary sum, and compensating the second user with the new money-representing data packet;
 wherein the first and second users are isolated from one another at least during the information accessing step and the generating and compensating step.

11. The system of claim 10, wherein the CIA further comprises a software agent comprising executable instructions for:
 configuring a first user active data packet area;
 storing each money-representing data packet in the first user's active data packet area; and
 granting the CIAS access to the first user's active data packet area for manipulating money-representing data packets therein.

* * * * *